(12) United States Patent
Hisano et al.

(10) Patent No.: US 9,832,296 B2
(45) Date of Patent: Nov. 28, 2017

(54) ELECTRONIC APPARATUS

(71) Applicant: KYOCERA Corporation, Kyoto-shi, Kyoto (JP)

(72) Inventors: Shuhei Hisano, Osaka (JP); Atsuki Ooi, Higashihiroshima (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/073,482

(22) Filed: Mar. 17, 2016

(65) Prior Publication Data

US 2016/0205230 A1 Jul. 14, 2016

Related U.S. Application Data

(63) Continuation of application No. PCT/JP2014/074657, filed on Sep. 18, 2014.

(30) Foreign Application Priority Data

Sep. 26, 2013 (JP) .................................. 2013-199747

(51) Int. Cl.
  *H04M 1/02* (2006.01)
  *H04M 1/18* (2006.01)
(52) U.S. Cl.
  CPC ......... *H04M 1/026* (2013.01); *H04M 1/0249* (2013.01); *H04M 1/185* (2013.01)
(58) Field of Classification Search
  CPC ..... H04M 1/185; H04M 1/0249; H04M 1/026
  See application file for complete search history.

(56) References Cited

U.S. PATENT DOCUMENTS

| 2013/0328792 A1* | 12/2013 | Myers | G06F 1/1652 |
| | | | 345/173 |
| 2014/0064536 A1* | 3/2014 | Kim | G02B 27/017 |
| | | | 381/333 |
| 2014/0355179 A1* | 12/2014 | Little | G06F 1/16 |
| | | | 361/679.01 |

FOREIGN PATENT DOCUMENTS

| EP | 2827564 A1 * | 9/2013 |
| JP | 2002-232542 A | 8/2002 |
| JP | 2009-108314 A | 5/2009 |
| JP | 2009-207198 A | 9/2009 |
| JP | 2011-061316 A | 3/2011 |
| JP | 2013-258653 A | 12/2013 |

OTHER PUBLICATIONS

International Search Report and Written Opinion of the International Searching Authority issued by the Japanese Patent Office for International Application No. PCT/JP2014/074657.

* cited by examiner

*Primary Examiner* — Ping Hsieh
(74) *Attorney, Agent, or Firm* — Procopio Cory Hargreaves and Savitch LLP (57) ABSTRACT

An electronic apparatus comprises a casing having an electronic component inside thereof, a cover panel including a first side and a second side which corresponds to a longitudinal side when the first side is defined as a lateral side, an attaching part located near the first side between the casing and the cover panel, a first adhesive part located near the second side between the casing and the cover panel, and a second adhesive part located to be surrounded by the attaching part between the casing and the cover panel.

10 Claims, 6 Drawing Sheets

ELECTRONIC APPARATUS

The present application is a continuation based on PCT Application No. PCT/JP2014/074657, filed on Sep. 18, 2014, which claims the benefit of Japanese Application No. 2013-199747, filed on Sep. 26, 2013. PCT Application No. PCT/JP2014/074657 is entitled "ELECTRONIC DEVICE" and Japanese Application No. 2013-199747 is entitled "ELECTRONIC APPARATUS". The contents of which are incorporated by reference herein in their entirety.

TECHNICAL FIELD

An embodiment of the present disclosure relates to an electronic apparatus.

BACKGROUND ART

Various technologies have conventionally been proposed for electronic apparatuses.

SUMMARY

An electronic apparatus is disclosed. In one embodiment, an electronic apparatus comprise: a casing, a cover panel, an attaching part, a first adhesive part, and a second adhesive part. The casing has an electronic component inside thereof. The cover panel includes a first side and a second side which corresponds to a longitudinal side when the first side is defined as a lateral side. The attaching part is located near the first side between the casing and the cover panel. The first adhesive part is located near the second side between the casing and the cover panel. The second adhesive part is located to be surrounded by the attaching part between the casing and the cover panel.

DESCRIPTION OF EMBODIMENT

<External Appearance of Electronic Apparatus>

An electronic apparatus 100 according to one embodiment shown in drawings is a mobile phone, for example.

Figure 1:
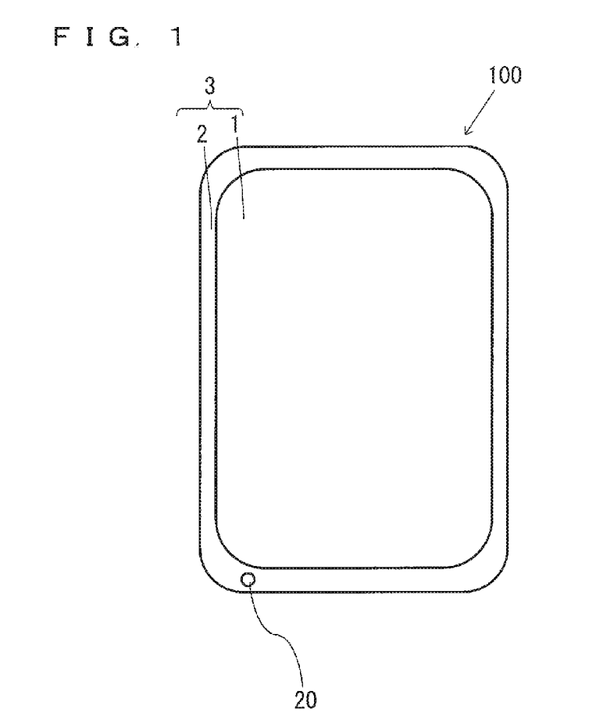
FIG. 1 illustrates a view showing a front surface in an external appearance of an electronic apparatus 1.

As illustrated in FIG. 1, the electronic apparatus 100 includes a cover panel 1 as a vibration part and a casing 2 as an exterior part. The cover panel 1 and the case part 2 are combined to constitute an apparatus case 3. The apparatus case 3 may have a plate shape substantially rectangular in a plan view.

The cover panel 1 may have a substantially rectangular shape in a plan view and forms a part in a front part of the electronic apparatus 100 other than a peripheral part thereof.

The cover panel 1 is transparent and is formed of, for example, a glass, an acrylic resin, or a sapphire crystal. Herein, the term "transparent" indicates that a visible light transmittance is 70% to 100%. The above sapphire crystal is made of aluminum oxide ($AlO_3$) crystal and is industrially-manufactured.

In one embodiment, the cover panel 1 may be a panel of a one-layer structure having a layer made of sapphire which is disposed on the surface of the electronic apparatus 100. Alternatively, the cover panel 1 may be a composite panel (laminated panel) of a multilayer structure having such a layer. For example, the cover panel 1 may be a composite panel of a two-layered structure configured of a layer (sapphire panel) made of sapphire which is disposed on the surface of the electronic apparatus 100 and a layer (glass panel) made of glass which is attached to the layer. Alternatively, the cover panel 1 may be a composite panel of a three-layered structure configured of a layer (sapphire panel) made of sapphire which is disposed on the surface of the electronic apparatus 100, a layer (glass panel) made of glass which is attached to the layer made of sapphire, and a layer (sapphire panel) made of sapphire which is attached to the layer made of glass. Further, the cover panel 1 may include a layer made of crystalline materials other than sapphire such as diamond, zirconia, titania, crystal, lithium tantalite, and aluminum oxynitride.

Figure 2:
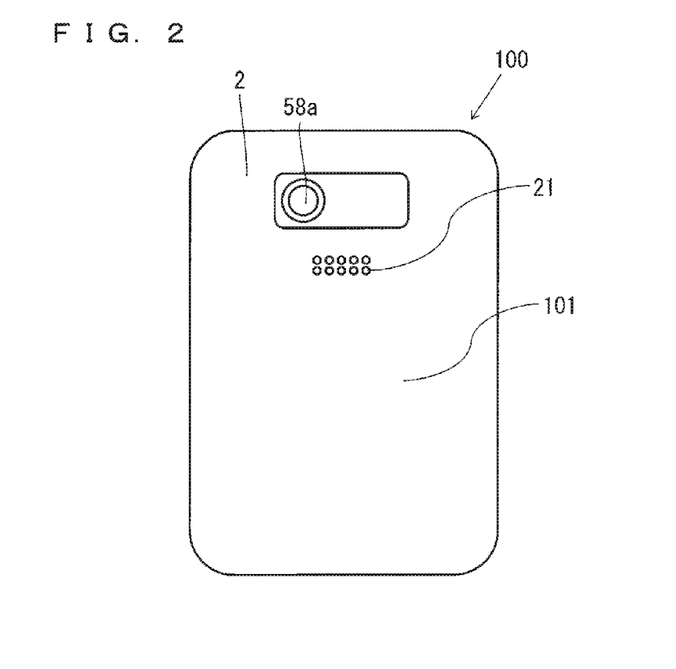
FIG. 2 illustrates a view showing a rear surface in the external appearance of the electronic apparatus.

The casing 2 forms the peripheral part of the front part, a lateral part, and a rear part of the electronic apparatus 100 (also refer to FIG. 2). The casing 2 is formed of, for example, a polycarbonate resin. A polycarbonate resin, an ABS resin, or a nylon-based resin, for example, is adopted as a resin to form the apparatus case 3. Only one member or a combination of plural members may constitute the casing 2.

The cover panel 1 includes a display part on which various types of information such as characters, symbols, and diagrams are displayed. The display part has, for example, a rectangular shape in a plan view. A peripheral part that surrounds a display part in the cover panel 1 may be black through, for example, application of a film, thereby serving as a non-display part on which no information is displayed. Attached to an inner main surface of the cover panel 1 is a touch panel 53, which will be described below. The user can provide various instructions to the electronic apparatus 100 by operating the display part of the cover panel 1 with his/her finger. A display panel 52, which will be described below, forms the display part.

<Method of Attaching Cover Panel 1 to Casing 2>

In one embodiment, as shown in FIGS. 3 to 6, located between the cover panel 1 and the casing 2 are an attaching part 601 and an adhesive part 602 which cause the cover panel 1 to be attached to the casing 2. That is to say, each of the attaching part 601 and the adhesive part 602 fixes the cover panel 1 to the casing 2. For example, the adhesive part 602 is located on an inner main surface of the cover panel 1.

A double-sided tape, for example, is adopted as the attaching part 601. The double-sided tape includes, for example, a double-sided tape whose base material, made of a foam, includes an acrylic adhesive on both surfaces thereof.

An adhesive agent, for example, is adopted as the adhesive part 602. For example, an adhesive agent for waterproofing or an adhesive agent made of a thermosetting resin is used as the adhesive agent.

A member softer than the adhesive part 602 may be adopted as the attaching part 601. Such an attaching part 601 includes, for example, a member which is made of a cushion material (an elastic material) including a both-sided tape on both surfaces thereof. The attaching part 601 is attached to the inner main surface of the cover panel 1 with the double-sided tape attached to one surface of the cushion material. The attaching part 601 is also attached to an inner surface of the apparatus case 3 with the double-sided tape attached to the other surface of the cushion material.

Figure 3:
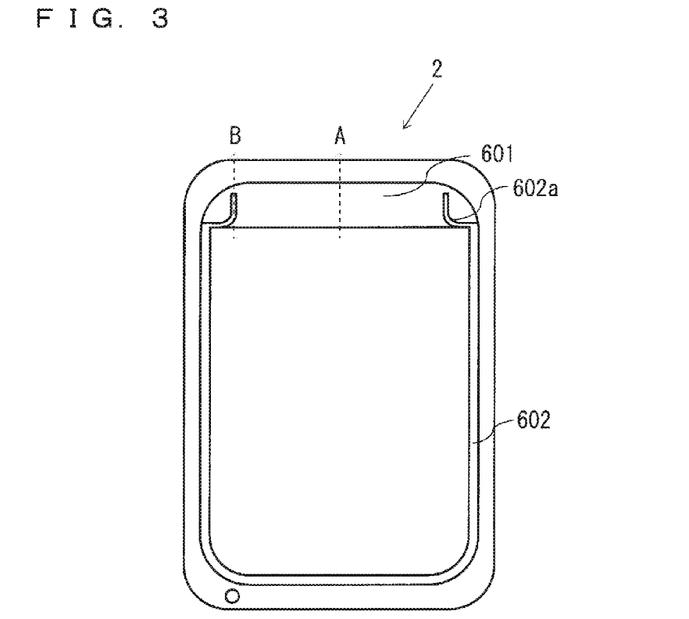
FIG. 3 illustrates a plan view of a casing 2 when viewed from a front surface side of the electronic apparatus.

FIG. 3 is a plan view of the casing 2. In FIG. 3, the cover panel 1 is not shown, but the attaching part 601 and the adhesive part 602 located on the casing 2 are shown. The attaching part 601 and the adhesive part 602 are located between the cover panel 1 and the casing 2. As shown in FIG. 3, the attaching part 601 and the adhesive part 602 are located at a fixing part in the casing 2 facing a peripheral edge of the cover panel 1. To be specific, the adhesive part 602 (corresponding to a first adhesive part) is located along a longitudinal side of the fixing part in the casing 2. The adhesive part 602 is, for example, continuously located on right and left longitudinal sides and a lower lateral side of the fixing part in the casing 2. The attaching part 601 is located along an upper lateral side of the fixing part in the casing 2.

Figure 4:
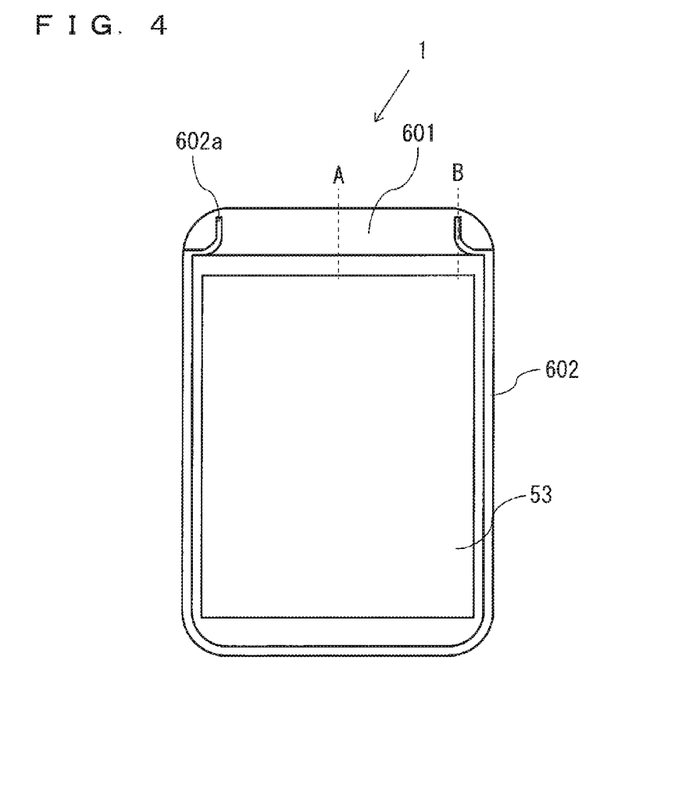
FIG. 4 illustrates a plan view of a cover panel 1 when viewed from a rear surface side of the electronic apparatus.

FIG. 4 is a plan view of the cover panel 1. In FIG. 4, the casing 2 is not shown, but the attaching part 601 and the adhesive part 602 located on the cover panel 1 are shown. The adhesive part 602 is located along a longitudinal side of the cover panel 1 and the attaching part 601 is located along a lateral side of the cover panel 1.

As shown in FIGS. 3 and 4, the adhesive part 602 has an extension part 602a (corresponding to a second adhesive part) extending to a side of attaching part 601. The extension part 602a is surrounded by the attaching part 601 near a corner part (a rounded corner part in the illustrations of FIGS. 3 and 4) formed by the longitudinal and lateral sides of the cover panel 1. That is to say, the attaching part 601 is located on an outer side of the extension part 602a. Conversely, the extension part 602a is located on an inner side of the attaching part 601. Although the above example describes a specific example of the second adhesive part that the extension part 602a is integral with the other part of the adhesive part 602, the present disclosure is not limited to the above configuration, so that the extension part 602a and the adhesive part 602 may be separated from each other. In other words, the extension part 602a may be continuous with/separated from the other part of the adhesive part 602.

Figure 5:
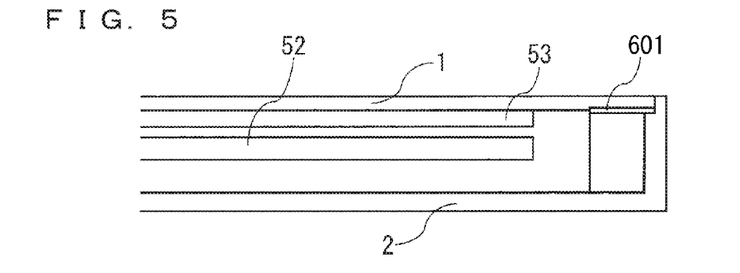
FIG. 5 illustrates a sectional view of the casing 2 and the cover panel 1 being cut along a dotted line A in FIGS. 3 and 4.
Figure 6:
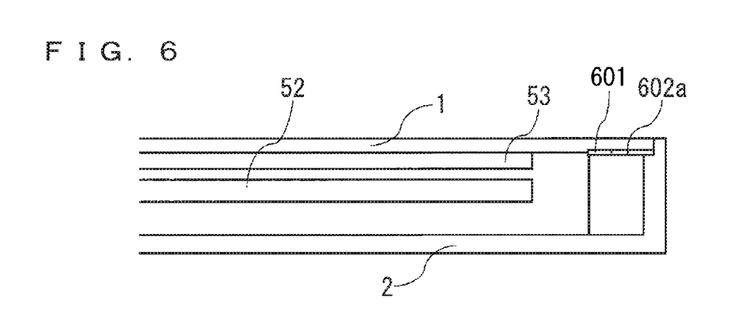
FIG. 6 illustrates a sectional view of the casing 2 and the cover panel 1 being cut along a dotted line B in FIGS. 3 and 4.

FIGS. 5 and 6 are views showing cutting surfaces along dotted lines A and B in FIGS. 3 and 4. The dotted line A is located in a center of the cover panel 1 in a lateral direction, and the dotted line B is located at an end part of the cover panel 1 in the lateral direction. In FIG. 5, the attaching part 601 is located in an upper center of the electronic apparatus, and in FIG. 6, the extension part 602a is located at an upper end side of the electronic apparatus. The touch panel 53 and the display panel 52 are located in a rear surface side of the cover panel 1. The touch panel 53 may be separated from/in contact with the display panel 52. The gap between the touch panel 53 and the display panel 52 in the manner of one embodiment can suppress the disturbance of the display panel 52 caused by the cover panel 1 contacting the display panel 52 (to be exact, the touch panel 53 may contact the display panel 52) even when the cover panel 1 is pressed with the finger or the like by the user and then flexes toward the display panel 52 side.

As shown in FIGS. 3 to 6, a periphery of the extension part 602a is in contact with the attaching part 601. An increase of a contact area between the extension part 602a and the attaching part 601 can enhance a waterproof property of the electronic apparatus.

A comparison example of omitting the extension part 602a from one embodiment shown in FIGS. 3 to 6 is considered. In this comparison example, only the attaching part 601 is located near the corner part formed by the longitudinal and lateral sides of the cover panel 1, and such a configuration has a shock resistance compared with the configuration including the adhesive part 602 such as the adhesive agent. The adhesive agent has a low tolerance for a force in a direction opposite to an adhesion direction (in other words, a force in a direction that the cover panel 1 and the casing 2 are separated along a normal direction thereof), so that when a deformation of the casing 2 being separated outward occurs due to a drop of the electronic apparatus, for example, an adhesion force is lowered. Accordingly, the attaching part 601 is preferably located near the corner part of the cover panel 1 which is especially susceptible to the shock due to the drop of the electronic apparatus.

Meanwhile, in view of the waterproof property, water may seep from the attaching part 601 and reach inside the electronic apparatus.

In the present disclosure, the extension part 602a is located to get inside the attaching part 601 near the corner part formed by the longitudinal and lateral sides of the cover panel 1, so that the contact area between the attaching part 601 and the extension part 602a is sufficiently ensured. Accordingly, even when the water seeps through the attaching part 601, the extension part 602a of the adhesive part 602 can enhance an effect not to cause the water to reach inside the electronic apparatus.

The attaching part 601 is located, so that the electronic apparatus in FIGS. 3 to 6 has the resistance to shock (due to the drop, for example).

As shown in FIGS. 3 and 4, the extension part 602a has a shape extending away from the longitudinal side of the cover panel 1 and afterwards, bending toward the lateral side of the cover panel 1. The extension part 602a in FIGS. 3 and 4 extends substantially in an arc, and its center of curvature is located outside the casing 2 relative to the extension part 602a. In other words, the extension part 602a has a shape bending toward a center side of the cover panel 1 in a plan view. Such a characteristic shape of the extension part 602a can suppress a dripping and a liquid pool when the adhesive agent as the adhesive part 602 is located on the attaching part 601. Moreover, the extension part 602a is preferable by reason that even when the water seeps from a corner of an upper side of the electronic apparatus, the water flows along a curved surface of the extension part 602a and is removed outside the electronic apparatus. The extension part 602a is not limited to the above configuration.

Figure 7:
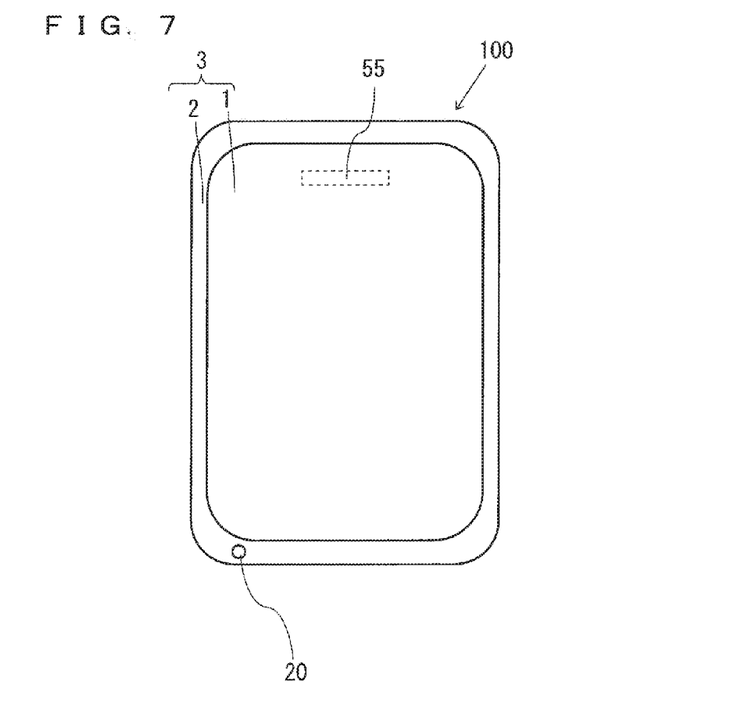
FIG. 7 illustrates a view showing a front surface in an external appearance of an electronic apparatus 1 according to one embodiment other than that of FIG. 1.
Figure 8:
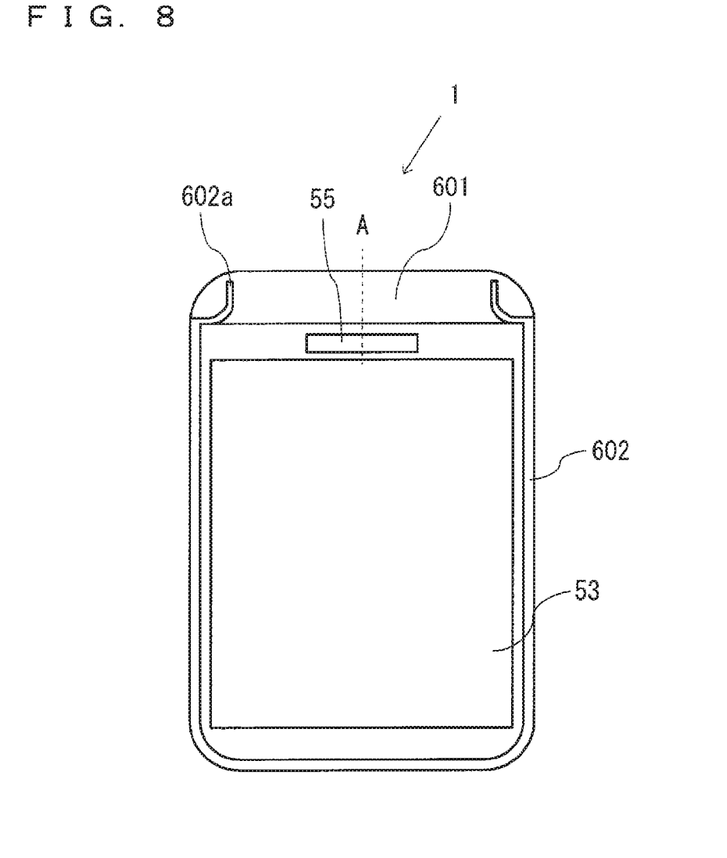
FIG. 8 illustrates a plan view of a cover panel 1 when view from a front surface side of the electronic apparatus shown in FIG. 7.
Figure 9:
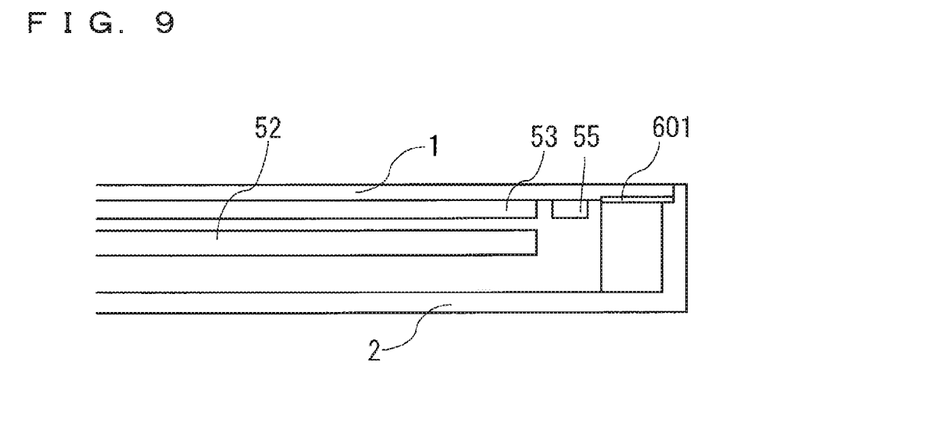
FIG. 9 illustrates a sectional view of a casing 2 and a cover panel 1 being cut along a dotted line A in FIG. 8.

In the electronic apparatus 100, there may be further located a piezoelectric vibration element 55 on the rear surface of the cover panel 1 as shown in FIGS. 7 and 8. The present disclosure is also preferable in the case of further providing the piezoelectric vibration element 55. In particular, it is preferable to locate the piezoelectric vibration element 55 near the attaching part 601 as shown in FIG. 9. According to such a configuration, the attaching part 601 is flexible compared to the adhesive part 602, so that the piezoelectric vibration element 55 can sufficiently cause the cover panel 1 to vibrate.

The piezoelectric vibration element 55 is attached to the rear surface of the cover panel 1 with a member such as a double-sided tape or an adhesive agent.

The piezoelectric vibration element 55 will be described below in detail.

A shock-absorbing part having a cushion or the like to absorb an impact (not shown) may be in contact with the rear surface (the main surface) of the cover panel 1. A state of "being in contact" can be achieved regardless of whether or not there is an intervening member, such as the double-sided tape or the adhesive, between the rear surface of the cover panel 1 and the shock-absorbing part. The shock-absorbing part is located away from a peripheral edge (the longitudinal and lateral sides) of the rear surface of the cover panel 1. There may be located the piezoelectric vibration element 55 between the shock-absorbing part and the upper lateral side of the rear surface of the cover panel 1. According to such an arrangement of the shock-absorbing part, a position of a point where a sound volume is maximum in the cover panel 1 can be shifted to an upper side of the electronic apparatus in a longitudinal direction compared to a case that no shock-absorbing part is located.

When an antenna 51a (described below) for a wireless communication is located in a lower part of the electronic apparatus 100, the point where the sound volume is maximum is preferably located in an upper part of the electronic apparatus 100 to the extent possible in consideration of a problem of SAR (Specific Absorption Rate).

Moreover, when the user holds the electronic apparatus 100 to his/her ear to hear the sound in a telephone conversation, for example, the point where the sound volume is maximum is preferably located in the upper part of the electronic apparatus 100 to the extent possible in view of a position of the ear.

As described above, since the shock-absorbing part is located so that the piezoelectric vibration element 55 is located between the shock-absorbing part and the peripheral edge of the rear surface of the cover panel 1, the point where the sound volume is maximum in the cover panel 1 is shifted to the upper side of the electronic apparatus 100 in the longitudinal direction compared to a conventional case. Accordingly, the point where the sound volume is maximum can be located in the upper part of the electronic apparatus 100 to the extent possible.

<Electrical Configuration of Electronic Apparatus>

Figure 10:
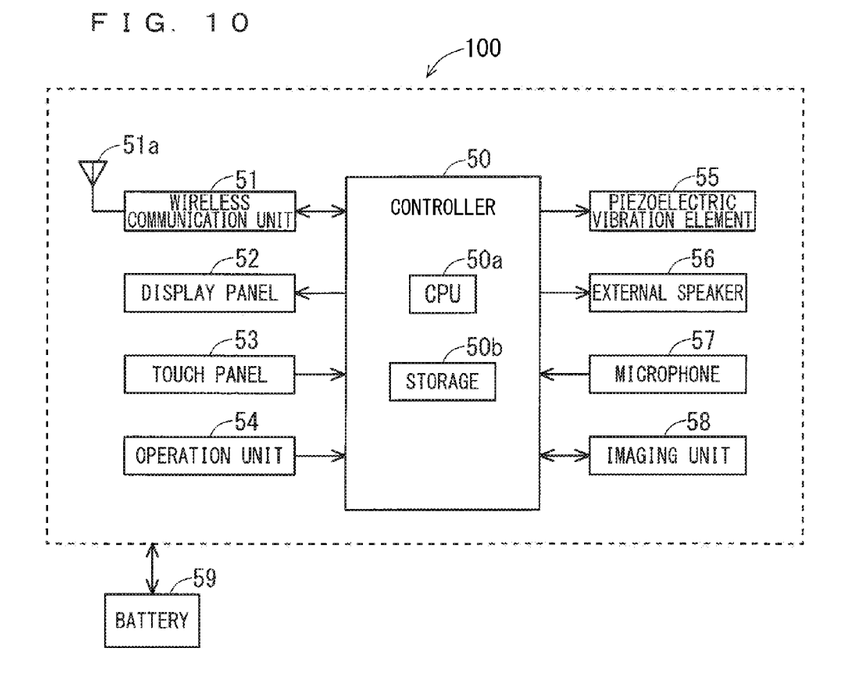
FIG. 10 illustrates a block diagram showing an electrical configuration of the electronic apparatus.

FIG. 10 is a block diagram illustrating an electrical configuration of the electronic apparatus 100. As illustrated in FIG. 10, the electronic apparatus 100 includes a controller 50, a wireless communication unit 51, a display panel 52 as a display, the touch panel 53 as a proximity detector, the operation unit 54, the piezoelectric vibration element 55, an external speaker 56, a microphone 57, the imaging sensor 58, and a battery 59. The apparatus case 3 houses these components.

The controller 50, for example, mainly includes a CPU 50a and a storage 50b, and can control other components of the electronic apparatus 100 to collectively manage the operation of the electronic apparatus 100. The storage 50b is mainly configured with a ROM and a RAM. The CPU 50a can perform various programs in the storage 50b, so that various function blocks are formed in the controller 50.

The wireless communication unit 51 can receive, through an antenna 51a, a signal from a mobile phone different from the electronic apparatus 100 or a communication device such as a web server connected to Internet via a base station. The wireless communication unit 51 can perform amplification processing and down-conversion processing on the received signal and then outputs a resultant signal to the controller 50. The controller 50 can perform modulation processing or other processing on the received signal that has been input, to thereby obtain a sound signal indicative of sound or music contained in the received signal. The wireless communication unit 51 can also perform up-conversion processing and amplification processing on a transmission signal including the sound signal or the like that has been generated by the controller 50, to thereby wirelessly transmit the processed transmission signal from the antenna 51a. The transmission signal from the antenna 51a is received, via the base station, by a mobile phone different from the electronic apparatus 100 or a communication device connected to the Internet.

The display panel 52 as the display is, for example, a liquid crystal display panel or an organic EL panel, and can display various types of information such as characters, symbols, and graphics under control of the controller 50. The information, which is to be displayed on the display panel 52, is displayed in the display part of the cover panel 1 to be visible to the user of the electronic apparatus 100. In one embodiment, the display indicates the display panel to display an image on a front surface of the electronic apparatus, however, the display panel includes not only the above configuration but can also include a display to display an image on a rear surface of the electronic apparatus.

The touch panel 53 as the proximity detector is, for example, a projected capacitive type touch panel and detects an operation performed by the user with the display part of the cover panel 1. The touch panel 53 is attached to the inner main surface of the cover panel 1 and includes two sheet-like electrode sensors disposed to face each other. The two electrode sensors are attached together with a transparent adhesive sheet.

Formed in one of the electrode sensors are a plurality of elongated X electrodes that extend in an X-axis direction (for example, the lateral direction of the electronic apparatus 100) and are disposed parallel to one another. Formed in the other electrode sensor are a plurality of elongated Y electrodes that extend in a Y-axis direction (for example, the longitudinal direction of the electronic apparatus 100) and are disposed parallel to one another. When a user's finger comes into contact with the display part of the cover panel 1, a capacitance between the X electrode and the Y electrode located below the contact portion changes, so that the touch panel 53 can detect the operation on the display part of the cover panel 1. A change in the capacitance between the X electrode and the Y electrode, which occurs in the touch panel 53, is transmitted to the controller 50. The controller 50 can identify, based on the capacitance change, the content of the operation made on the display part of the cover panel 1, and perform the operation corresponding to the identified content.

The touch panel is included as the proximity detector as described above, however, one embodiment is not limited to the touch panel. For example, the proximity detector also includes a tactile sensor which vibrates or transmits a sensation of touching a projection, for example, to the user's finger in response to a contact of the user's finger. A sensor as the proximity detector is not limited to one detecting the contact such as the touch panel, but a sensor which can detect the proximity, even without the contact, is also included in the proximity detector. For example, a proximity sensor is included. A capacitive type proximity detection device which can receive the capacitance change more sensitively than the capacitive type touch panel may be also included.

When the user presses the operation button, the operation unit 54 outputs to the controller 50 an operation signal indicating that the operation button has been pressed. The controller 50 identifies, based on the input operation signal, whether or not the operation button has been operated and then performs the operation corresponding to the operation button that has been operated.

The piezoelectric vibration element 55 can transmit the received sound to the user of the electronic apparatus 100. The piezoelectric vibration element 55 is vibrated by the drive voltage applied from the controller 50. The controller 50 can generate a drive voltage based on a sound signal which indicates the received sound, and then apply the drive voltage to the piezoelectric vibration element 55. The piezoelectric vibration element 55 is vibrated based on a sound signal, which indicates the received sound, by the controller 50, whereby the received sound is transmitted to the user of the electronic apparatus 100. In the above manner, the controller 50 functions as a driver to vibrate the piezoelectric vibration element 55 based on the sound signal. The piezoelectric vibration element 55 will be described below in detail.

The external speaker 56 converts an electrical sound signal from the controller 50 into sound and then outputs the sound. The sound output from the external speaker 56 is output to the outside through a speaker hole 21 located in a rear surface 101 of the electronic apparatus 100. Located on the rear surface 101 of the electronic apparatus 100, in other words, on the rear surface of the apparatus case 3 is the speaker hole 21 as shown in FIG. 2.

The microphone 57 converts the sound input from the outside of the electronic apparatus 100 into an electrical sound signal and then outputs the electrical sound signal to the controller 50. The sound from the outside of the electronic apparatus 100 is taken inside the electronic apparatus 100 through a microphone hole 20 located in the electronic apparatus 100 to be input to the microphone 57, for example. As shown in FIG. 1, the apparatus case 3 includes the microphone hole 20.

The imaging unit 58 is configured with an imaging lens 58a, an image sensor, and the like, and takes a still image and a moving image under the control of the controller 50. An imaging lens 58a which is included in an imaging unit 58 is exposed from the rear surface 101 of the electronic apparatus 100.

The battery 59 outputs a power for the electronic apparatus 100. The power output from the battery 59 is supplied to respective electronic components included in the controller 50, the wireless communication unit 51, and the like included in the electronic apparatus 100.

Although the speaker hole 21 is illustrated to output a sound from a speaker as the above example, there is no need to provide the speaker hole 21 when a film speaker including a piezoelectric vibration element, for example, is adopted as the speaker.

Although the microphone hole 20 is located to collect a sound in the microphone in an example of FIGS. 1 and 7, there is no need to provide the microphone hole 20 when the sound can be converted into an electrical signal without a hole.

<Details of Piezoelectric Vibration Element>

Figure 11:
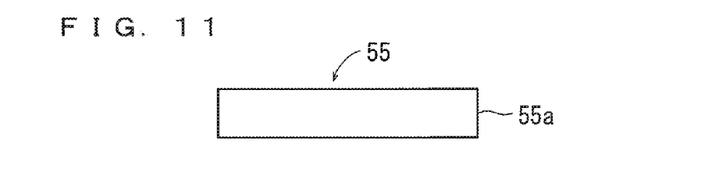
FIG. 11 illustrates a plan view showing a piezoelectric vibration element.
Figure 12:
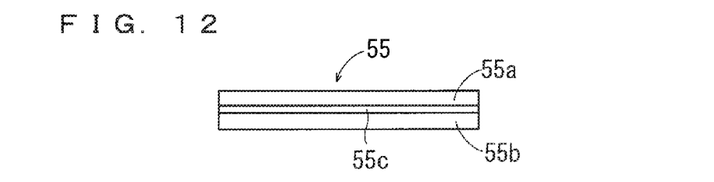
FIG. 12 illustrates a side view showing a piezoelectric vibration element.

FIGS. 11 and 12 are a top view and a side view illustrating a structure of the piezoelectric vibration element 55, respectively. As illustrated in FIGS. 11 and 12, the piezoelectric vibration element 55 may have a long shape in one direction. To be specific, the piezoelectric vibration element 55 may have an elongated plate shape rectangular in a plan view.

A thickness of the piezoelectric vibration element 55 may be 0.5 to 0.8 mm. A long side of the piezoelectric vibration element 55 may be 10 to 20 mm, and a short side thereof may be 2 to 5 mm in a plan view.

The piezoelectric vibration element 55 has a bimorph structure, for example, and includes a first piezoelectric plate 55a and a second piezoelectric plate 55b attached to each other with a shim material 55c therebetween.

In the piezoelectric vibration element 55, a positive voltage is applied to the first piezoelectric plate 55a and a negative voltage is applied to the second piezoelectric plate 55b, so that the first piezoelectric plate 55a expands in the long-side direction and the second piezoelectric plate 55b contracts in the long-side direction. This causes, as illustrated in FIG. 13, the piezoelectric vibration element 55 to flex toward the first piezoelectric plate 55a in a convex manner.

In the piezoelectric vibration element 55, meanwhile, a negative voltage is applied to the first piezoelectric plate 55a and a positive voltage is applied to the second piezoelectric plate 55b, so that the first piezoelectric plate 55a contracts in the long-side direction and the second piezoelectric plate 55b expands in the long-side direction. This causes, as illustrated in FIG. 14, the piezoelectric vibration element 55 to flex toward the second piezoelectric plate 55b in a convex manner.

Figure 13:
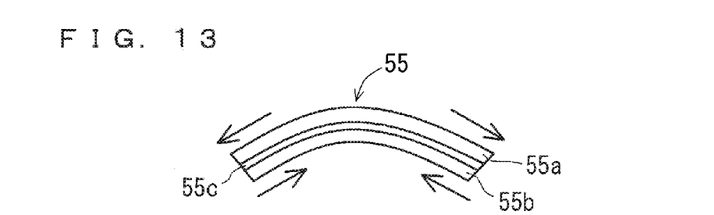
FIG. 13 illustrates a view showing a state where the piezoelectric vibration element is bent.
Figure 14:
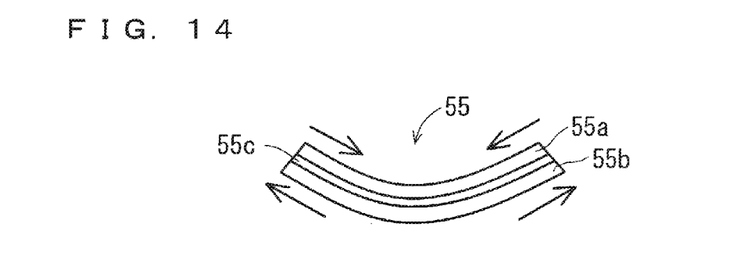
FIG. 14 illustrates another view showing the state where the piezoelectric vibration element is bent.

The piezoelectric vibration element 55 alternately enters the state of FIG. 13 and the state of FIG. 14, thereby producing flexural vibrations. The controller 50 causes an AC voltage, which alternates between positive and negative voltages, to be applied between the first piezoelectric plate 55a and the second piezoelectric plate 55b, causing the piezoelectric vibration element 55 to produce flexural vibrations.

While the piezoelectric vibration element 55 illustrated in FIGS. 11 to 14 includes a single structure configured with the first piezoelectric plate 55a and the second piezoelectric plate 55b that are attached with the shim material 55c sandwiched therebetween, a plurality of the above-mentioned structures may be laminated.

The piezoelectric vibration element 55 may be made of a piezoelectric ceramic material or an organic piezoelectric material such as polyvinylidene fluoride and polylactic acid. Specifically, when the piezoelectric vibration element 55 is made of the organic piezoelectric material, a polylactic acid film, for example, is used as each of the first piezoelectric plate 55a and the second piezoelectric plate 55b and laminated. In addition, a transparent electrode such as ITO (Indium-Tin-Oxide, that is to say, indium tin oxide), for example, may be used as the electrode.

<Generation of Received Sound by Vibration of Piezoelectric Vibration Element>

In one embodiment, the piezoelectric vibration element 55 causes the cover panel 1 to vibrate, so that air conducted sound and tissue conduction sound are transmitted to the user from the cover panel 1. In other words, the vibrations of the piezoelectric vibration element 55 itself are transmitted to the vibration part such as the cover panel 1, allowing for the transmission of air conducted sound and tissue conduction sound to the user from the cover panel 1.

Herein, the air conducted sound is the sound recognized by a human brain when a sound wave (air vibrations), which has entered the external auditory meatus (so-called "earhole"), causes an eardrum to vibrate. Meanwhile, the tissue conduction sound is the sound recognized by the human brain when an auricle cartilage is vibrated and vibrations of the auricle cartilage are transmitted to the eardrum, which causes the eardrum to vibrate. The air conducted sound and tissue conduction sound will now be described in detail.

Figure 15:
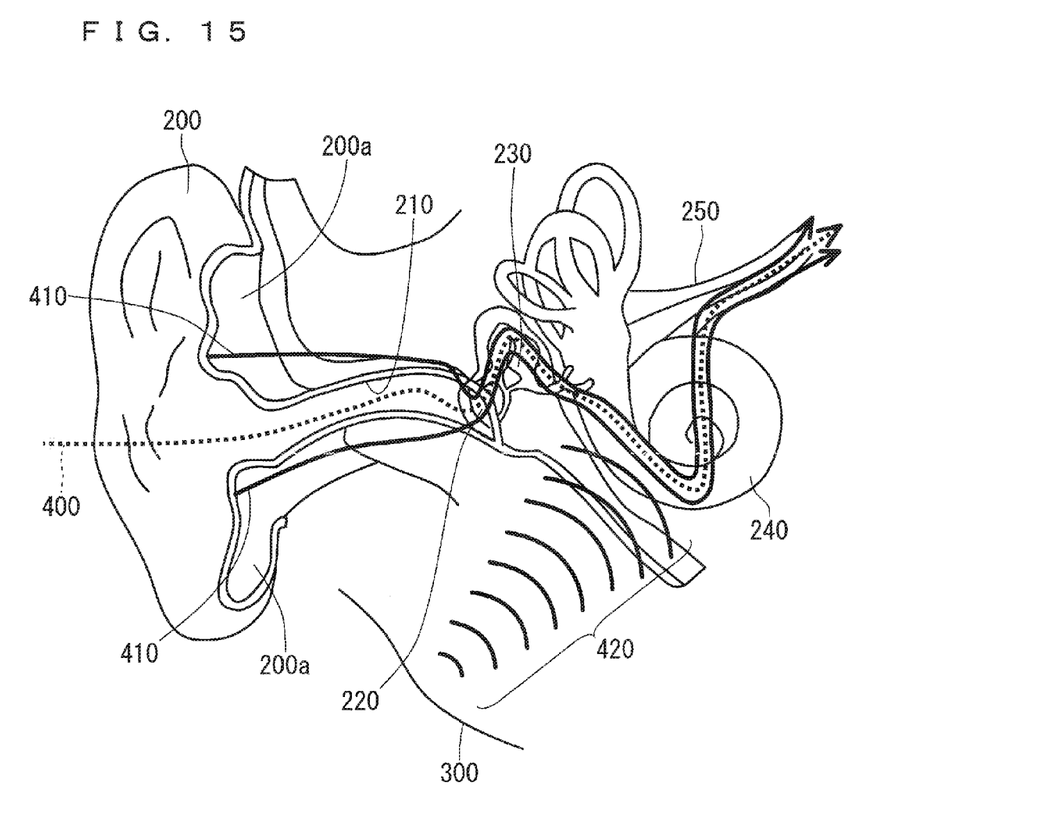
FIG. 15 illustrates a view for describing air conducted sound and tissue conduction sound.

FIG. 15 is a drawing for describing the air conducted sound and tissue conduction sound. FIG. 15 illustrates the structure of the user's ear of the electronic apparatus 100. In FIG. 15, a dashed line 400 indicates a conductive path of a sound signal (sound information) when the air conducted sound is recognized by the brain, and a solid line 410 indicates a conductive path of a sound signal when the tissue conduction sound is recognized by the brain.

When the piezoelectric vibration element 55 mounted on the cover panel 1 is vibrated based on an electrical sound signal indicative of received sound, the cover panel 1 vibrates, whereby a sound wave is output from the cover panel 1. When the user has the electronic apparatus 100 in his/her hand and brings the cover panel 1 of the electronic apparatus 100 close to an auricle 200 of the user or holds the cover panel 1 of the electronic apparatus 100 to the auricle 200 of the user, the sound wave output from the cover panel 1 enters an external auditory meatus 210. The sound wave from the cover panel 1 travels through the external auditory meatus 210 and causes an eardrum 220 to vibrate. The vibrations of the eardrum 220 are transmitted to an auditory ossicle 230, causing the auditory ossicle 230 to vibrate. Then, the vibrations of the auditory ossicle 230 are transmitted to a cochlea 240 and are then converted into an electrical signal in the cochlea 240. The electrical signal is transmitted to the brain through an auditory nerve 250, so that the brain recognizes the received sound. In this manner, the air conducted sound is transmitted from the cover panel 1 to the user.

When the user has the electronic apparatus 100 in his/her hand and holds the cover panel 1 of the electronic apparatus 100 to the auricle 200 of the user, an auricle cartilage 200a is vibrated by the cover panel 1 vibrated by the piezoelectric vibration element 55. The vibrations of the auricle cartilage 200a are transmitted to the eardrum 220, causing the eardrum 220 to vibrate. The vibrations of the eardrum 220 are transmitted to the auditory ossicle 230, causing the auditory ossicle 230 to vibrate. The vibrations of the auditory ossicle 230 are then transmitted to the cochlea 240 and are then converted into an electrical signal by the cochlea 240. The electrical signal is transmitted to the brain through the auditory nerve 250, whereby the brain recognizes the received sound. In this manner, the tissue conduction sound is transmitted from the cover panel 1 to the user.

Bone-conducted sound (also referred to as "bone conduction sound") is the sound recognized by the human brain when the skull is vibrated and the vibrations of the skull directly stimulate the inner ear such as the cochlea. In FIG. 15, illustrating the case in which, for example, a mandibular bone 300 is vibrated, a plurality of arcs 420 indicate a transmission path of a sound signal when the bone conduction sound is recognized by the brain.

As described above, in the electronic apparatus 100 according to one embodiment, the piezoelectric vibration element 55 appropriately vibrates the cover panel 1 on the front surface, in other words, the piezoelectric vibration element 55 appropriately transmits the vibrations of the piezoelectric vibration element 55 itself to the cover panel 1 on the front side, so that the air conducted sound and tissue conduction sound can be transmitted from the cover panel 1 to the user of the electronic apparatus 100. The structure of the piezoelectric vibration element 55 according to one embodiment is contrived to appropriately transmit the air conducted sound and tissue conduction sound to the user. Various advantages can be achieved by configuring the electronic apparatus 100 to transmit the air conducted sound and tissue conduction sound to the user.

For large ambient noise, the user can make it difficult to hear the ambient noise by putting his/her ear strongly to the cover panel 1 while turning up the volume of the tissue conduction sound. This enables the user to appropriately have a telephone conversation even if the ambient noise is large.

Even while wearing earplugs or earphones in his/her ears, the user can recognize the received sound from the electronic apparatus 100 by holding the cover panel 1 to his/her ear (more specifically, auricle). Alternatively, even while wearing headphone in his/her ears, the user can recognize the received sound from the electronic apparatus 100 by holding the cover panel 1 to the headphones.

<Earpiece Hole (Reception Hole)>

An electronic apparatus such as a mobile phone often has an earpiece hole in the cover panel 1 on the front surface so that the sound, which is output from a receiver (reception speaker) located inside the electronic apparatus, is taken outside the electronic apparatus.

In the electronic apparatus 100 according to one embodiment, the piezoelectric vibration element 55 causes the cover panel 1 to vibrate to transmit the sound to the user. Accordingly, the cover panel 1 which outputs the sound does not have an earpiece hole (Reception hole). That is to say, there is no earpiece hole in the surface of the electronic apparatus 100. Accordingly, there is no need of the processing of making the earpiece hole in the cover panel 1. As a result, a manufacturing cost of the electronic apparatus 100 can be reduced, and a cost reduction of the electronic apparatus 100 can be achieved. Especially when the cover panel 1 is formed of glass, sapphire, or the like, it is hard to make the hole in the cover panel 1, so that the manufacturing cost of the electronic apparatus 100 can be further reduced by not making the earpiece hole in the cover panel 1. The strength of the cover panel 1 can be enhanced by not making the earpiece hole in the cover panel 1. Moreover, freedom in designing the front surface of the cover panel 1 is enhanced by not making the earpiece hole in the cover panel 1. Especially when the cover panel 1 occupies a large part of the front surface of the electronic apparatus 100 as one embodiment, no earpiece hole in the cover panel 1 is quite effective from a standpoint of the design. Since there is no earpiece hole in the surface of the electronic apparatus 100 in one embodiment, no problem that water, dust, or the like enters from the earpiece hole does not occur. Since the electronic apparatus 100 does not need a waterproof structure or dustproof structure for the above problem, the cost reduction of the electronic apparatus 100 can be further achieved.

In one embodiment, the vibrations of the cover panel 1 generate the received sound, so that the received sound can be appropriately transmitted to the user without the earpiece hole in the electronic apparatus 100.

Although the examples above have been given of the case where the present disclosure is applied to a mobile phone, the present disclosure is also applicable to electronic apparatuses other than mobile phones. The present disclosure is also applicable to, for example, game machines, notebook computers, portable navigation systems.

Although the examples above indicate the mobile phone including the touch panel 53 as the electronic apparatus 100, one embodiment is not limited to it, but the input operation may be performed on an electronic apparatus 100 which enables the input operation with hard keys without providing the touch panel 53.

The invention claimed is:

1. An electronic apparatus comprising:
    a casing having an electronic component inside thereof;
    a cover panel including a first side and a second side which corresponds to a longitudinal side when the first side is defined as a lateral side;
    an attaching part located near the first side between the casing and the cover panel;
    a first adhesive part located near the second side between the casing and the cover panel; and
    a second adhesive part located to be surrounded by the attaching part between the casing and the cover panel,
    wherein both the second adhesive part and the attaching part are completely covered by the cover panel, and the second adhesive part extends away from the second side and afterwards, bending toward the first side, terminates in an end that is proximal to the first side.

2. The electronic apparatus according to claim 1,
    wherein the first adhesive part is continuous with the second adhesive part.

3. The electronic apparatus according to claim 1 further comprising a piezoelectric vibration element located on the cover panel.

4. The electronic apparatus according to claim 1,
    wherein the attaching part comprises a double-sided tape.

5. The electronic apparatus according to claim 1,
    wherein the attaching part comprises a foam.

6. The electronic apparatus according to claim 1,
    wherein the cover panel comprises a sapphire panel.

7. The electronic apparatus according to claim 1, wherein the cover panel and the casing overlap with each other in an area, and the second adhesive part and the attaching part are coplanar in the area where the cover panel and the casing overlap with each other.

8. The electronic apparatus according to claim 1, wherein the second adhesive part terminates in segment that is parallel with the second side which corresponds to a longitudinal side.

9. The electronic apparatus according to claim 1, wherein the second adhesive part terminates in an end.

10. An electronic apparatus comprising:
    a casing having an electronic component inside thereof;
    a cover panel including a first side and a second side which corresponds to a longitudinal side when the first side is defined as a lateral side;
    an attaching part located near the first side between the casing and the cover panel;
    a first adhesive part located near the second side between the casing and the cover panel; and
    a second adhesive part located to be surrounded by the attaching part between the casing and the cover panel,
    wherein both the second adhesive part and the attaching part are completely covered by the cover panel, and the second adhesive part extends substantially in an arc, and includes a center of curvature located outside of the casing.

* * * * *